United States Patent [19]

Jones et al.

[11] 4,088,979
[45] May 9, 1978

[54] UNDERWATER IMAGING SYSTEM

[75] Inventors: Charles H. Jones, Pasadena, Md.; Milton Gottlieb, Churchill Boro., Pa.

[73] Assignee: Westinghouse Electric Corp., Pittsburgh, Pa.

[21] Appl. No.: 723,256

[22] Filed: Sep. 14, 1976

[51] Int. Cl.$^2$ ............................ G01S 9/66; G01S 7/62
[52] U.S. Cl. .................................. 340/5 H; 340/6 S; 358/112
[58] Field of Search ................. 340/5 H, 5 MP, 6 S; 358/90, 99, 112, 201, 235

[56]  References Cited
U.S. PATENT DOCUMENTS

| | | | |
|---|---|---|---|
| 3,364,461 | 1/1968 | Trott | 340/6 S |
| 3,412,372 | 11/1968 | Ladstatter | 340/6 S |
| 3,593,254 | 7/1971 | Glenn et al. | 340/5 H |
| 3,636,248 | 1/1972 | Korpel | 340/5 H |
| 3,685,008 | 8/1972 | Bhuta et al. | 340/5 MP |

Primary Examiner—Richard A. Farley
Attorney, Agent, or Firm—D. Schron

[57] ABSTRACT

Acoustic imaging system wherein signals from a target of interest impinge upon a set of receiving transducers. The transducer signals are processed and form the input signals to a transparent delay line through which is projected coherent light from a laser. Suitable optics and detectors are positioned relative to the projected laser beam so as to produce an output signal that is applied to a CRT to display a range profile or contour map of the target area.

22 Claims, 12 Drawing Figures

UNDERWATER IMAGING SYSTEM

BACKGROUND OF THE INVENTION

1. Field of the Invention

The invention in general relates to acoustic imaging systems for underwater use, and particularly to such systems which eliminate the requirement for an acoustic lens.

2. Description of the Prior Art

In underwater imaging systems for viewing target areas, a variety of methods exist for beam forming or image formation utilizing an array of acoustic transducers. One of the simplest methods incorporates an acoustic lens; however, at relatively low frequencies these lenses are generally too bulky to be practical.

One type of imaging system which eliminates the necessity for an acoustic lens employs a digital computer. With such a system, an image is formed from an array of acoustic transducer receiving elements providing output signals to a computer which stores the phase and amplitude received by each array element and performs a mathematical operation on the values to obtain the source distribution of the target area, which is then displayed. Such a system, however, is relatively expensive in the requirements of a digital computer and programming thereof with the computation time being relatively expensive.

Another system incorporating an array of receiving transducers sonifies an underwater target area of interest to produce a sonic image which is combined with a reference signal to generate a holographic video signal which is displayed on the face of a special tube. The special tube is illuminated with a laser beam and the hologram is converted to an object image which is picked up by a TV camera and displayed on a monitor. Although such a system eliminates the requirement for a digital computer, the "special tube" is extremely expensive and requires high voltage power supplies.

SUMMARY OF THE INVENTION

The present invention provides for an acoustic imaging system using holographic principles but wherein the cost of equipment is significantly reduced. The system includes a plurality of acoustic receiver transducers which receive reflected acoustic energy from a target area of interest. The output signals from the transducers are combined with a reference signal and the resulting holographic signals are sampled in sequence and used to modulate a carrier signal that is fed to an opto-acoustic delay line to produce a phase hologram which moves along the delay line at a certain velocity. As the modulation signal from the transducer elements moves along the delay line, a coherent light beam projected through the delay line is converted to a stationary light pattern that is detected, and the detected signal is suitably displayed.

The sampling of all of the transducer signals may take place in a time interval corresponding to a single range resolution increment and, depending upon the array and subsequent processing, the target area may be portrayed as a profile type display or a contour type display, in real time.

DESCRIPTION OF THE PREFERRED EMBODIMENTS

Figure 1:
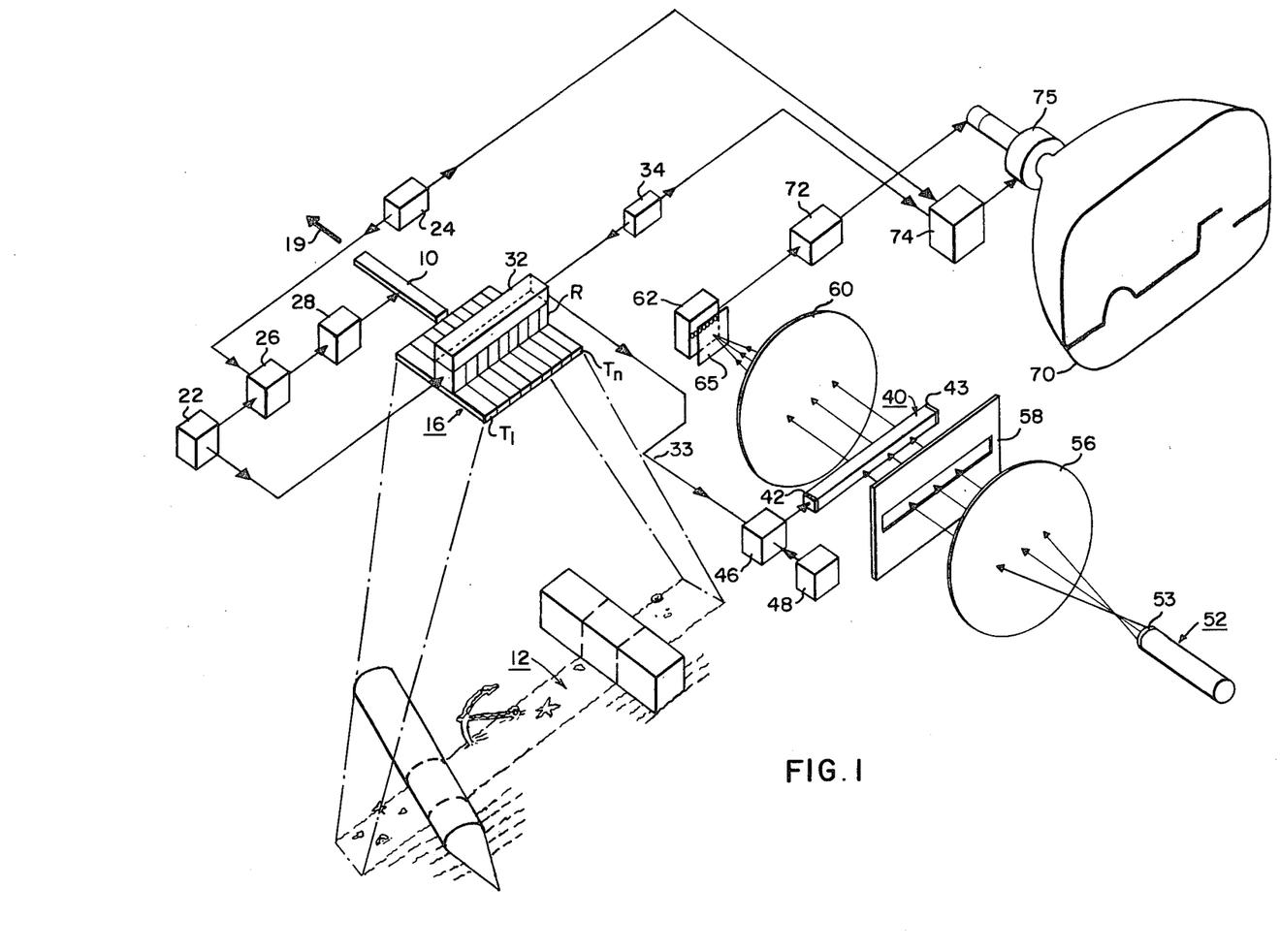
FIG. 1 is a diagrammatic view of one embodiment of the present invention.

Referring now to FIG. 1, (not to scale) a transmitter transducer 10 is activated to project a pulse of acoustic energy to sonify a target area of interest 12 in a relatively narrow strip. A plurality of acoustic receiver transducers 16 is positioned to receive reflected acoustic energy such that the transducers $T_I$ to $T_n$ provide respective output signals indicative thereof. The $n$ received signals are each amplified, combined with a reference signal, detected and cyclicly sampled. All $n$ channels must be sampled in a time less than the time associated with one range resolution increment.

When each of the $n$ received signals are suitably combined with a reference signal, the amplitude of the detected output signals for any particular set of $n$ samples are indicative of an acoustic hologram of a particular slice, or range increment. The information for each range increment is displayed and the apparatus design is such that as the vehicle carried apparatus travels over the target area, in the direction of arrow 19, repetitive acoustic transmissions take place to sonify adjacent strips in the direction of travel. To accomplish these repetitive transmissions, projector or transmitting transducer 10 is provided with a number of cycles of the output signal from oscillator 22 as determined by pulse generator 24. The output signal from pulse generator 24 is provided to modulator 26 which then passes the output of oscillator 22 to amplifier 28 to energize transducer 10. Accordingly, the time interval between successive pulses of generator 24 is chosen to be a little longer than the time it takes acoustic energy to travel to and from a point at the maximum range of interest.

Figure 2:
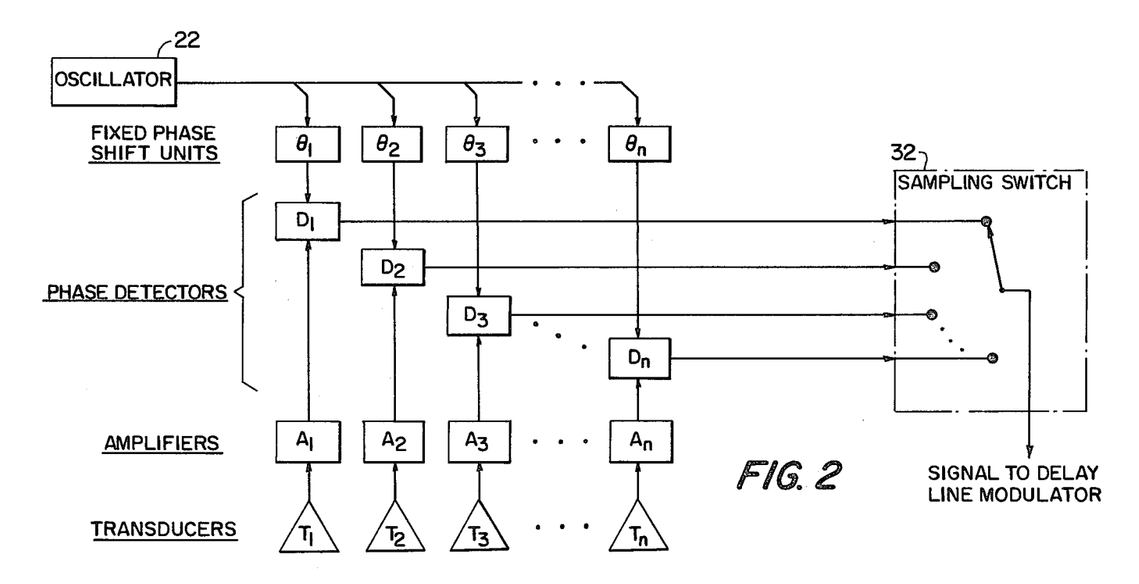
FIG. 2 illustrates a receiver arrangement utilized in FIG. 1.
Figure 3:
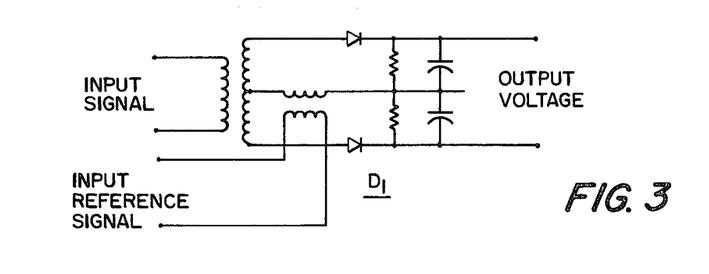
FIG. 3 illustrates a typical phase sensitive detector circuit.

A plurality of receivers R includes a set of $n$ amplifiers and $n$ phase sensitive detectors as illustrated by way of example in FIG. 2. In producing holographic type signals it is generally desirable to simulate an "off-axis" reference beam. This can be accomplished electronically and accordingly the reference signal from oscillator 22 is fed to a set of $n$ fixed phase shift units $\theta_1$ through $\theta_n$. The outputs of these units are fed to a set of $n$ phase detector units $D_I$ through $D_n$ which also receive signals from each of the transducers $T_I$ through $T_n$ after amplification in amplifiers $A_I$ through $A_n$. The phase detectors produce an output which is proportional to the product of the two input amplitudes multiplied by the cosine of the phase angle between the two. Such circuit is well known and a typical phase detector $D_i$ is shown in FIG. 3. Referring once again to FIG. 2 the $n$ outputs from the phase detectors are provided to a sample switch 32 which cycles once in a time interval less than the projected pulse width, to produce a composite signal.

Figures 4, 5:
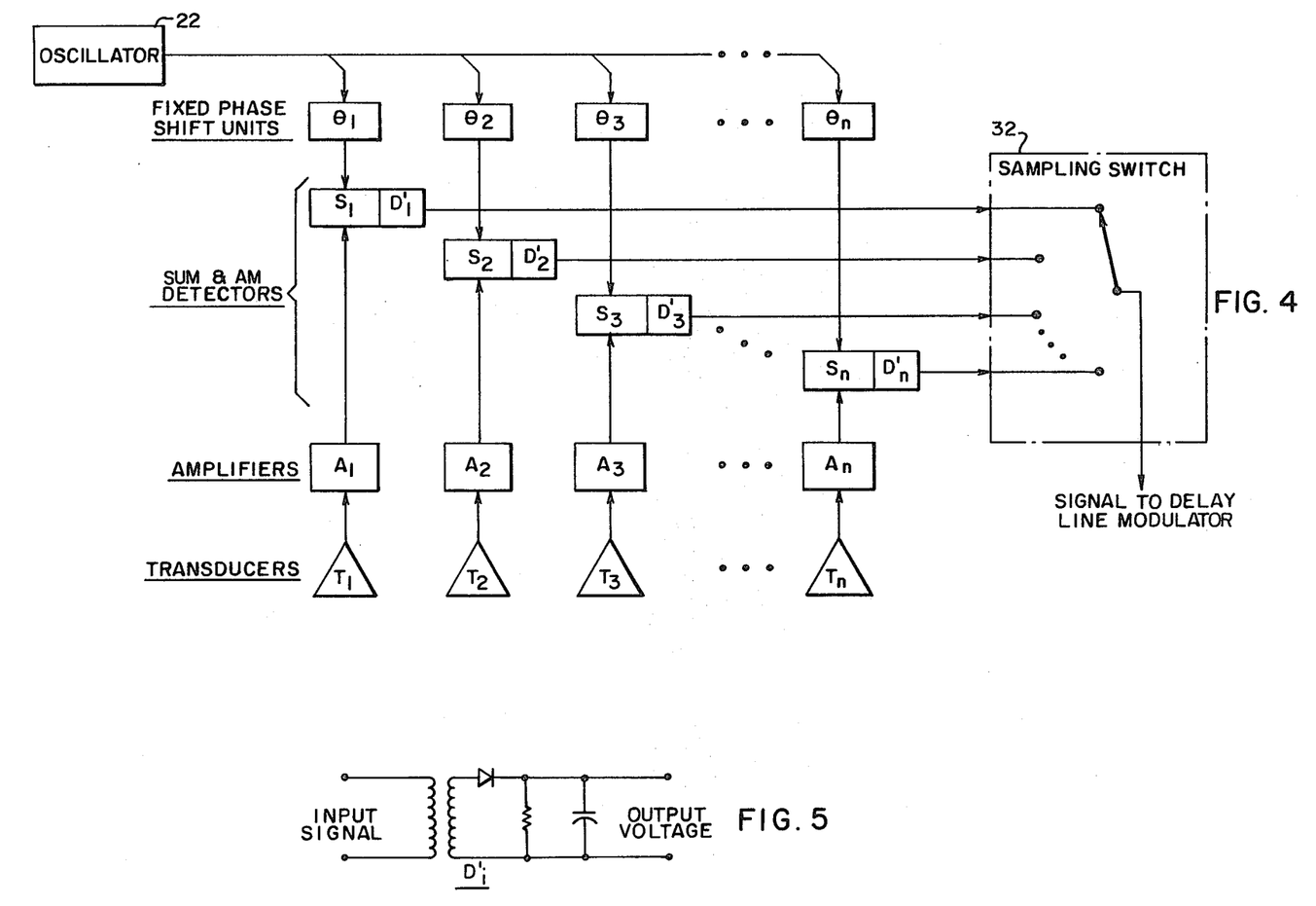
FIG. 4 illustrates an alternate receiver arrangement.
FIG. 5 illustrates a typical AM detector.

An alternate means of deriving the signals to be sampled is shown in FIG. 4. In this embodiment each of the phase shifted reference signals is simply added to the corresponding amplified received signal in adder circuits $S_1$ through $S_n$ and the resultant signals are detected with simple diode detectors $D'_1$ through $D'_n$, a typical one, $D'_i$, being illustrated in FIG. 5. It is desirable for the amplitude of the reference signal to be at least 10 times that of the largest received signal.

The output stage of the detector circuit is comprised of, by way of example, a capacitor (FIG. 5) or capacitors (FIG. 3) upon which the signals are stored for a time equal to the time it takes acoustic energy to travel out and back a distance equal to the range resolution desired. For example, if the range resolution were 2 feet, the required storage time would be 800 microseconds. The sampling then takes place at a rate such that the sampling switch 32 provides a complete set of $n$ samples in a time of 400 microseconds or less and the output signal from sampling switch 32 is a composite signal.

With reference again to FIG. 1, the apparatus includes the opto-acoustic processing of the composite signal and for this purpose there is provided a delay line 40 having at one end thereof transducer means 42 for injecting a signal, and at the other end thereof absorbing means 43 so as to prevent unwanted acoustic reflections. The delay line may, by way of example, be made of high quality glass such as fused quartz, and is transparent. Such delay lines are well known to those skilled in the art and are utilized for opto-acoustic signal processing such as in the radar field for signal correlation of complex RF signals or optical filtering, by way of example. In the present invention, the composite output signal from the sampling switch 32 is used to amplitude modulate, in modulator 46, the output of a carrier signal from oscillator 48. The resulting amplitude modulated signal is provided to transducer 42 and injected into delay line 40, so as to provide a moving phase hologram traveling down the delay line at its propagation velocity. The sampling rate will depend on the length of the delay line employed and the acoustic velocity in said line. It is desirable to sample at such a rate that one set of $n$ modulation signals occupies less than the total length of the delay line. It is also necessary to sample all of the $n$ signals in a time interval less than the duration of the projected pulse.

Figure 6:
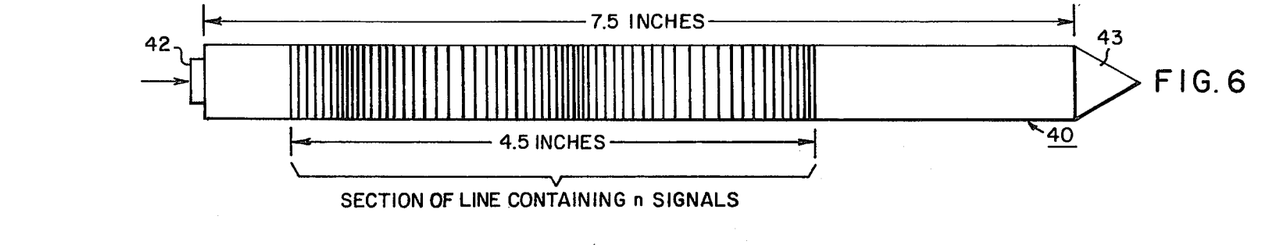
FIG. 6 illustrates another view of the delay line of FIG. 1.

By way of example, consider a delay line having a propagation velocity of 0.15 inches per microsecond. If $n = 90$ and the sampling rate is 3 MHz, then the total sampling time will be 30 microseconds. An acoustic signal will move 4.5 inches down the line in 30 microseconds. If the line is 7.5 inches long as shown in FIG. 6, then the entire phase hologram will be present on the line for 20 microseconds.

The reading out of the phase hologram is accomplished with the provision of a source of coherent light in the form of laser 52 which, in conjunction with lens 53, projects a beam of light which is collimated by means of a large lens 56. The collimated light is projected through mask 58, and after transmission through delay line 40 is projected through a focusing lens 60, as is commonly done in holographic signal processing arrangements.

In order to provide a signal for display which is derived from the phase hologram within the delay line 40, there is provided detector means 62 which receives the light from lens 60 after filtering by filter 65. In one embodiment the detector means 62 may be a row of $p$ photodiodes whose output signals would correspond to $p$ simultaneous sonar beams. The photodiode output signals are amplified, sampled and provided to a display such as cathode ray tube 70, in which instance the photodiode output signals would be amplified in video amplifier 72 and provided to the intensity control grid of the display tube 70. In another embodiment a TV camera tube can be used to detect and read out the line image produced on the retina of said tube by the coherent light which was transformed by the moving hologram into a stationary image.

The necessary horizontal and vertical sweep signals for operation of CRT 70 are provided by horizontal and vertical sweep circuits 74 to deflection coil 75 and are designed to be compatible with the operation of the remainder of the system. For example, in response to each acoustic transmission, the display will generally show a profile with a 2-foot range resolution. Accordingly, the vertical sweep is synchronized with the acoustic transmission, governed by pulse generator 24, and the horizontal sweep will be synchronized with the same synchronizing signal that initiates the sampling of the transducer output signals as governed by sync circuit 34. With a long persistence phosphor on the face of CRT 70 the viewer will see a slowly changing profile of the target area as the apparatus proceeds over it.

Figure 7:
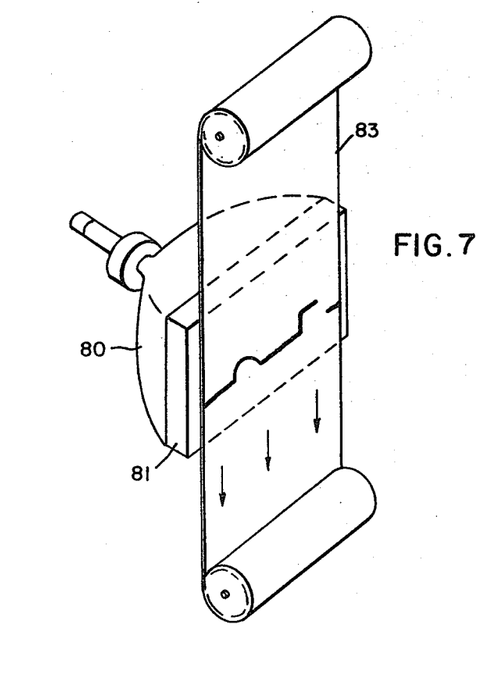
FIG. 7 is a method of obtaining a permanent recording of the display of FIG. 1.
Figure 8:
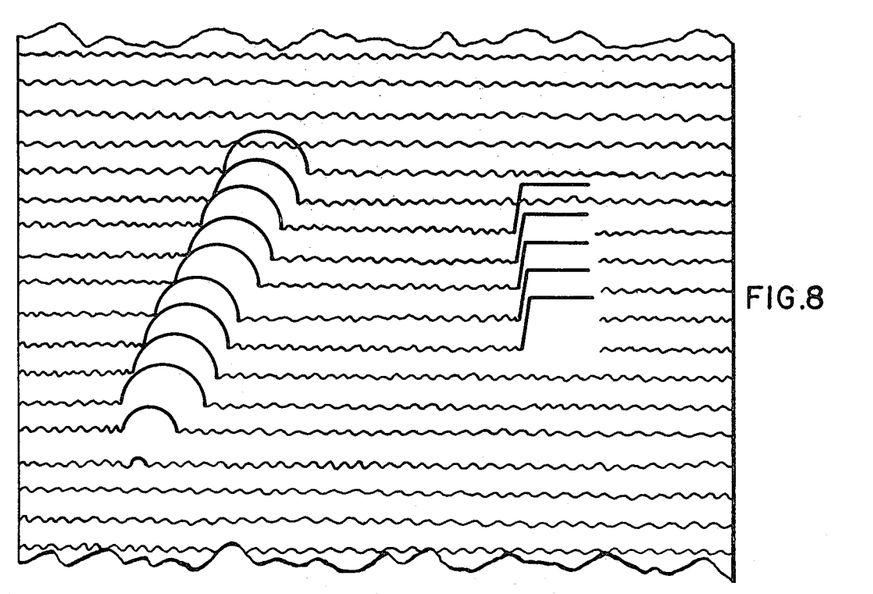
FIG. 8 illustrates a typical recording obtained by the apparatus of FIG. 7.

For many situations it may be desirable to obtain a permanent record of the successive profiles. FIG. 7 illustrates such arrangement and includes a cathode ray tube 80 having a fiber optic faceplate 81 across which is moved photographic film 83. After the processing, the resultant display will be similar to that illustrated in FIG. 8.

Figure 9:
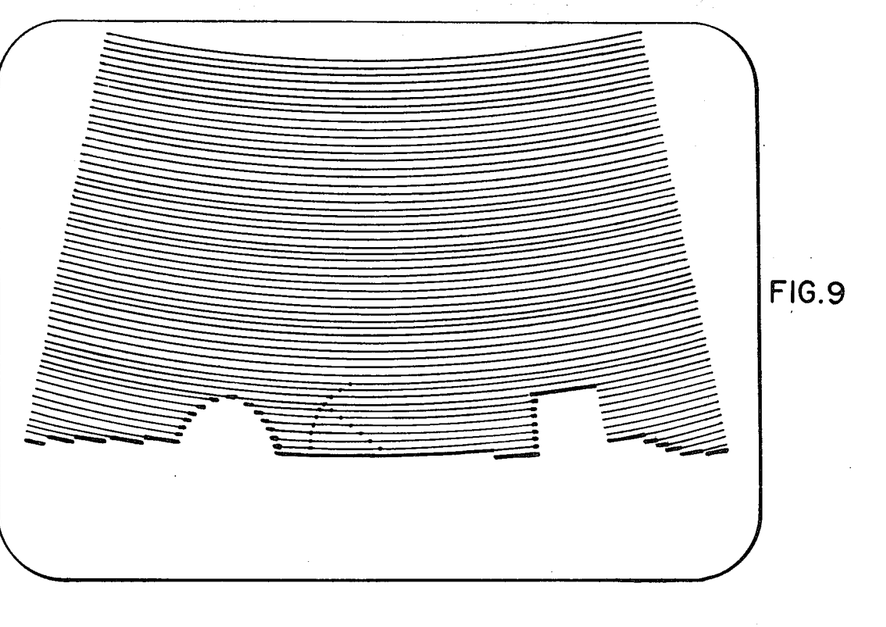
FIG. 9 illustrates a display for the system of FIG. 1.

For observing a relatively narrow angular field of view, the horizontal sweep signals for the display may be conventional sawtooth signals, however, for a wide angle of view, for example $\pm 30°$, it may be desirable to modify the shape of the sweep signals such that the resultant cathode ray beam sweeps a series of arcs as illustrated in FIG. 9, so as to provide a relatively undistorted profile of the target area.

Figure 10:
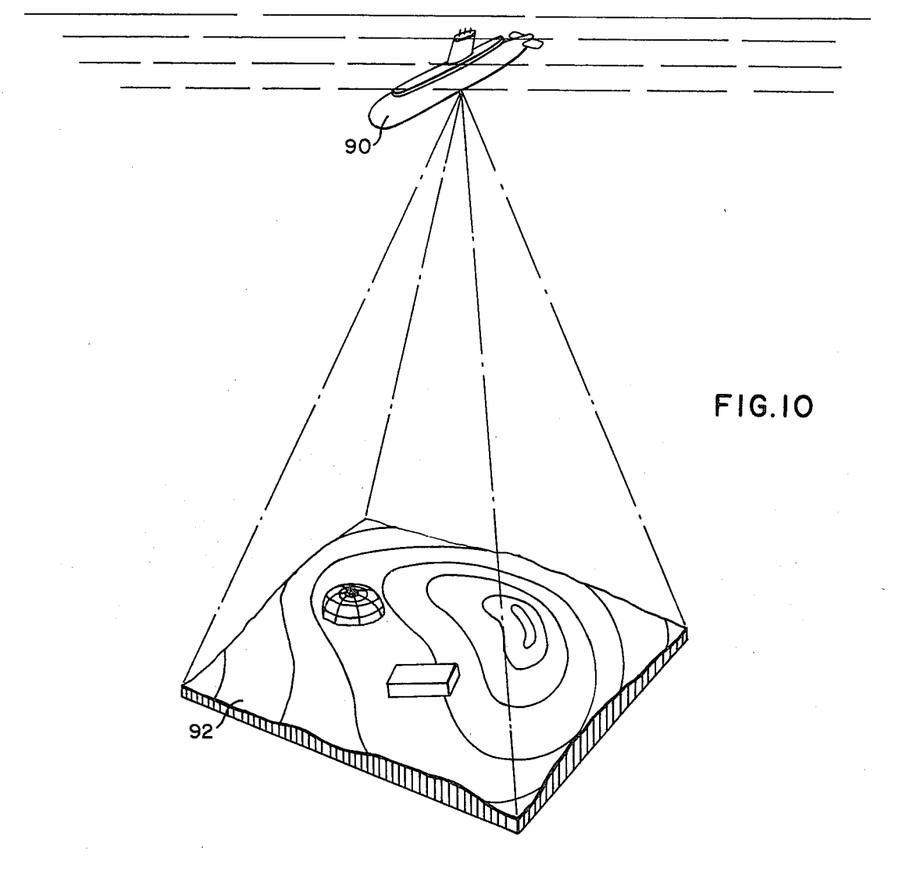
FIG. 10 illustrates a carrier vehicle operating over a target area of interest.

In the apparatus of FIG. 1, a profile display is slowly generated as the carrier vehicle moves over the target area. For some operations it would be desirable to move at a faster rate over the target area and in other situations it would be desirable to examine a relatively large target area as in a stationary imaging sonar system. In FIG. 10, there is illustrated a carrier vehicle 90 located over a target area of interest 92 to be examined and displayed.

Figure 11:
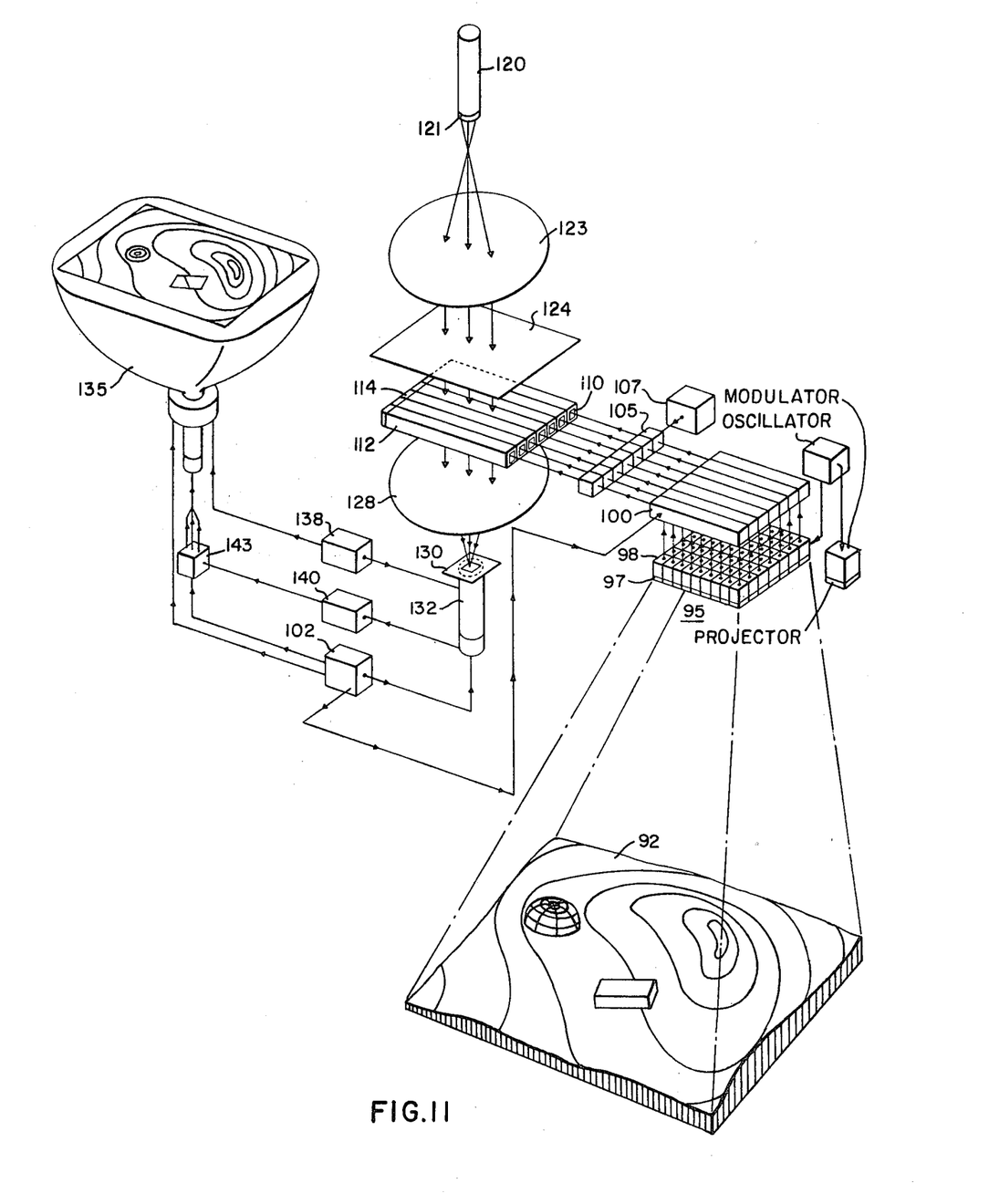
FIG. 11 is a diagrammatic view of another embodiment of the present invention and carried by the vehicle of FIG. 10.

FIG. 11 illustrates another embodiment of the present invention which can accomplish the portrayal of target 92 as a contour display, and if desired can display the area in various colors corresponding to range increments. Whereas in FIG. 1 there was provided a linear array of transducers, the apparatus of FIG. 11 includes an array of transducers 95 arranged in $n$ columns and $m$ rows. Each receiver transducer 97 of the array is amplified and combined with a reference signal in unit 98 to provide an output signal to a set of $m$ sampler switches 100 which sample the output signals from $m$ rows of transducers in response to a sync pulse from sync circuit 102. In effect, each row operates in a similar manner to the linear array of FIG. 1.

The $m$ composite sampled signals are utilized in an array of $m$ modulators 105, to modulate the output signal from oscillator 107 to provide a plurality of amplitude modulated signals. These signals are applied to respective input transducers 110 of $m$ opto-acoustic delay lines 112 terminated by absorbing means 114. The delay lines 112 may if desired be fabricated from a single piece of fused quartz or may be individual delay lines stacked one upon another.

As was the case with respect to FIG. 1, the apparatus of FIG. 11 includes a coherent light source 120 which together with lens 121, collimater lens 123 and a mask 124 irradiates the entire surface of delay line 112. The projected light, after passing through delay line 112, focusing lens 128 and filter 130, is sensed by a detector means 132. Although the detector may be comprised of the photodiodes of FIG. 1, arranged in an $m$ by $n$ array, FIG. 11 illustrates an alternate pickup in the form of a sensitive TV camera tube such as an electron bombardment induced conductivity (EBICON) tube.

Figure 12:
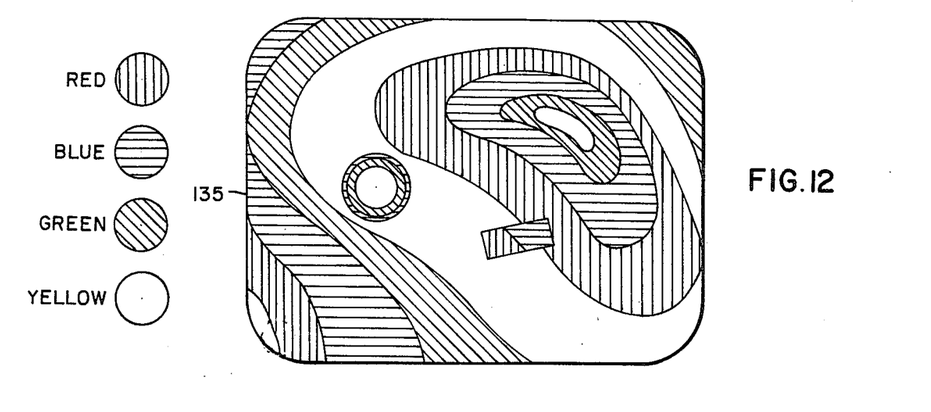
FIG. 12 illustrates a typical display of the target area of FIG. 10 for the apparatus of FIG. 11.

The delay line system provides a two dimensional phase hologram and the image on the pickup tube will correspond to a two dimensional picture of the second energy being reflected from objects at a specific range. The output from this pickup tube is utilized to control the display on a color CRT 135. Synchronization of the vertical and horizontal sweeps of the pickup tubes 132 and color CRT 135 is accomplished with sync circuit 102 and horizontal sweep circuit 138. The output signal from pickup tube 132 is amplified in video amplifier 140 and provided to a color switching circuit 143 which functions to vary the colors on the face of CRT 135 in a sequential manner so that at one range reflected energy is shown as one color, at the next range the image changes color, with the color changing at successive ranges, and thereafter repeating. For example, with a 2-foot range resolution, and only utilizing four different colors, the target area of FIG. 10 would show up on the face of CRT 135 as illustrated in FIG. 12.

Accordingly, there has been provided an underwater imaging system which produces a phase hologram of an area of interest by utilization of a relatively inexpensive glass delay line thus eliminating requirements for special tubes requiring high voltage power supplies and costing many thousands of dollars more than the simple glass delay line. Image quality can be improved in holographic systems by employing amplitude shading across the length of a line array of the type used in FIG. 1 or across the area associated with the transducer array shown in FIG. 11. The gain of the elements near the center of the array is preferably greater than that of the elements near the edge of the array. This technique reduces undesirable or false images which are present in the reconstructed image when no shading is employed. Such shading techniques have been used for fixed beam and swept beam systems, but have not previously been used in holographic imaging.

We claim:

1. An electro-opto-acoustic imaging system comprising:
   acoustic means including a plurality of transducers each operable to provide an output signal indicative of acoustic energy from a target area to be viewed;
   an opto-acoustic delay line system;
   means for converting said signals into a phase hologram which propagates along said opto-acoustic delay line; and
   means for converting said phase hologram into a visual display of said target area.

2. An underwater imaging system comprising:
   means for projecting acoustic energy toward a target area of interest;
   a plurality of acoustic receiver transducers each operable to provide an output signal in response to reflected acoustic energy from said area;
   a source of a reference signal;
   means for combining said output signals with said reference signal to provide a set of output signals;
   means for sampling said output signals in sequence to form a composite signal;
   a source of coherent light;
   opto-acoustic delay line means transparent to said light;
   a source of carrier signal;
   means for modulating said carrier signal with said composite signal;
   means for injecting said modulated signal into said delay line means;
   means for projecting said light through said delay line means;
   utilization means positioned to intercept said light projected through said delay line means.

3. Apparatus according to claim 2 wherein means are provided to project a pulse of acoustic energy toward a target area of interest.

4. Apparatus according to claim 2 wherein the plurality of receiver transducers consists of a single row of transducer elements, and in which a single opto-acoustic delay line is employed to obtain a line image at said utilization means.

5. Apparatus according to claim 2 wherein the plurality of receiver transducers consist of a set of $m$ rows and $n$ columns of transducer elements, and in which a set of $m$ parallel delay lines are provided so that a two dimensional image is formed at the said utilization means.

6. Apparatus according to claim 2 wherein said means for combining said output signals with a reference signal includes a plurality of phase sensitive detector units.

7. Apparatus according to claim 2 wherein said means for combining said output signals with said reference signal includes a plurality of adder circuits, and further includes a plurality of AM detectors for receiving the outputs of said adder circuits.

8. Apparatus according to claim 6 which further includes a plurality of phase shift units to provide predetermined phase shifts to said reference signal.

9. Apparatus according to claim 7 which further includes a plurality of phase shift units to provide a set of predetermined phase shifts of said reference signal.

10. Apparatus according to claim 2 which includes means for storing and sampling said output signals to define predetermined range resolution increments.

11. Apparatus according to claim 2 in which said utilization means comprises a TV camera tube.

12. Apparatus accordng to claim 2 wherein said utilization means includes:
   detector means;
   a focusing lens positioned between said delay line means and said detector means;
   said detector means being operable to provide an output signal in response to the intensity of said light projected through said delay line means; and said focusing lens; and display means responsive to the output signal of said detector means for providing a visual indication of said target area.

13. Apparatus according to claim 12 wherein said display means is a CRT.

14. Apparatus according to claim 12 wherein said visual indication is a profile display.

15. Apparatus according to claim 12 wherein said visual indication is a contour display.

16. Apparatus according to claim 15 which includes means for displaying said contours in color with adjacent contour range increments being displayed in different colors.

17. Apparatus according to claim 2 wherein said system is carried by a vehicle adapted for movement over said target area; and said projection of acoustic energy is in repetitive transmission cycles.

18. Apparatus according to claim 2 wherein said acoustic receiver transducers are arranged in a linear array.

19. Apparatus according to claim 12 wherein said detector means includes a linear array of photodiodes.

20. Apparatus according to claim 2 wherein said acoustic receiver transducers are arranged in a plurality of $n$ rows and a plurality of $m$ columns.

21. Apparatus according to claim 20 wherein said delay line means is of a size to accommodate the simultaneous parallel injection of $m$ signals.

22. Apparatus according to claim 2 wherein each receiver transducer has an associated amplifier in which the gain is made a function of the distance from the center of the transducer array, the amplifier associated with the center transducer of the array having the highest gain and those associated with the outer transducer having the lowest gain.

* * * * *